US006798940B2

(12) United States Patent
Lee et al.

(10) Patent No.: US 6,798,940 B2
(45) Date of Patent: Sep. 28, 2004

(54) OPTICAL TUNABLE FILTERS AND OPTICAL COMMUNICATION DEVICE INCORPORATED THEREIN OPTICAL TUNABLE FILTERS

(75) Inventors: Myung-Lae Lee, Pusan (KR); Won-Ick Jang, Taejon (KR); Chang-Auck Choi, Taejon (KR); Youn-Tae Kim, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 0 days.

(21) Appl. No.: 09/853,289

(22) Filed: May 9, 2001

(65) Prior Publication Data

US 2002/0081073 A1 Jun. 27, 2002

(30) Foreign Application Priority Data

Dec. 22, 2000 (KR) ........................................ 2000-80716

(51) Int. Cl.[7] .............................. G02B 6/26; G02B 6/42
(52) U.S. Cl. ....................................................... 385/18
(58) Field of Search ............................ 385/18; 359/578, 359/579; 356/519

(56) References Cited

U.S. PATENT DOCUMENTS

| | | | | |
|---|---|---|---|---|
| 4,377,324 A | * | 3/1983 | Durand et al. ............... 359/578 |
| 4,751,509 A | * | 6/1988 | Kubota et al. ............... 345/207 |
| 4,887,109 A | * | 12/1989 | Fujita et al. ................. 359/673 |
| 5,737,104 A | | 4/1998 | Lee et al. |
| 5,786,915 A | * | 7/1998 | Scobey ........................ 359/127 |
| 5,808,763 A | | 9/1998 | Duck et al. |
| 5,990,769 A | * | 11/1999 | Tam .............................. 335/18 |
| 6,008,920 A | | 12/1999 | Hendrix |
| 6,160,834 A | * | 12/2000 | Scott ............................ 372/20 |
| 6,212,292 B1 | * | 4/2001 | Soares ......................... 250/306 |
| 6,324,192 B1 | * | 11/2001 | Tayebati ....................... 372/20 |
| 6,351,577 B1 | * | 2/2002 | Aksyuk et al. ............... 385/15 |
| 6,426,830 B1 | * | 7/2002 | Robinson ..................... 359/308 |

\* cited by examiner

*Primary Examiner*—Toan Ton
*Assistant Examiner*—Richard Kim
(74) *Attorney, Agent, or Firm*—Blakely, Sokoloff, Taylor & Zafman

(57) ABSTRACT

The disclosure concerns to an optical filter for use in an optical communication device such as a multiplexer and demultiplexer. The optical filter is a Fabry-Perot filter that is formed with a silicon substrate by using a silicon micromachining process and a silicon etching process. The optical filters are applied to various optical communication devices, such as multiplexer (MUX) or demultiplexer (DEMUX) In each of the optical communication devices, the optical filters are installed and integrated on the silicon substrate together with input/output optical fibers and collimating lenses, resulting in simplifying the manufacturing process thereof and, hence, in reducing the manufacturing cost thereof. Furthermore, each of the optical filters incorporates therein an actuator so as to be tunable (wavelength-selective) in the optical filtering function and to be capable of filtering more various wavelengths in a range.

7 Claims, 8 Drawing Sheets

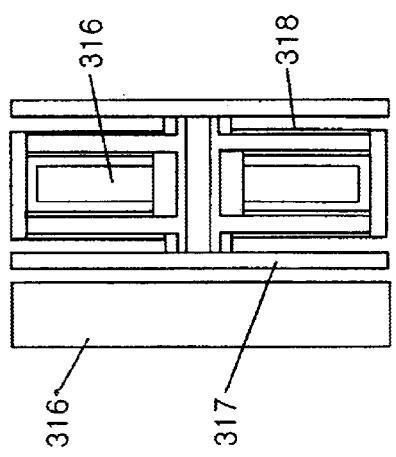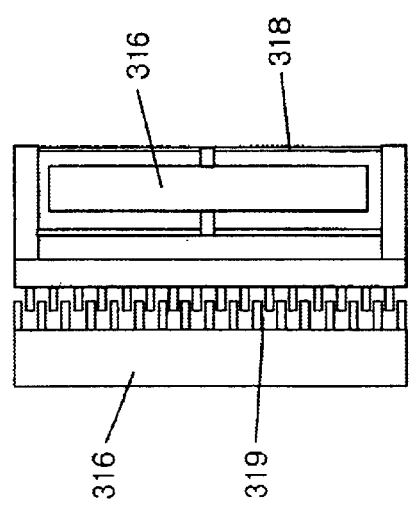

OPTICAL TUNABLE FILTERS AND OPTICAL COMMUNICATION DEVICE INCORPORATED THEREIN OPTICAL TUNABLE FILTERS

FIELD OF THE INVENTION

The present invention relates to an optical device for use in wavelength-division multiplexing (WDM) techniques; and, more particularly, to an optical communication device, for multiplexing and demultiplexing various wavelength, employing a Fabry-Perot filter which has a novel structure achieved by using a silicon micromachining process.

DESCRIPTION OF THE PRIOR ART

In general, WDM techniques provides means for multiplexing, i.e., combining, multiple optical sources of different wavelengths for coupling into a single optical fiber for simultaneous transmission and means for demultiplexing, i.e., separating, the different wavelengths for detection by optical receivers, wherein each of wavelength loads large amount of information. In WDM techniques, a channel generally incorporates therein 64, 128 or more wavelengths with 0.8 nm (100 GHz) of a wavelength separation. Recently, it is provided dense wavelength-division multiplexing (DWDM) techniques utilizing a channel including wavelengths with 0.4 nm (50 GHz) of a wavelength separation in order to obtain more channels.

In the forgoing optical communication, one of necessary optical device is an optical filter having an accurate wavelength-resolution. Conventional optical filters are fabricated by a way of alternately stacking or depositing tens of dielectric layers having a high refractive index and a low refractive index.

Refractive index difference between two alternating layers should become large so as to obtain a high separation for transmitted wavelengths and a reduced crosstalk between adjacent wavelengths. Two materials that can be used up to now and will give the largest refractive index difference therebetween are silicon (a refractive index of 3.48 at the wavelength of 1550 nm) and air (a refractive index of 1).

Conventional optical filters incorporating therein multiple laminated layers for use in an optical communication device such as multiplexer, demultiplexer (MUX/DEMUX) are disclosed in U.S. Pat. Nos. 5,808,763, 6,008,920 and 5,737,104. In the above disclosures, a multilayered filter is formed on a substrate. When various wavelengths are incident upon the multilayered filter with a specific incidence angle, various wavelengths are separated from each other by a repetition way of that one wavelength is transmitted to outside and the other wavelengths are reflected within the multilayered filter with a changed incidence angle. In other words, the multilayered filter separates various wavelengths into each other with a wavelength transmission property determined with respect to the incidence angle.

Other conventional filter disclosed in U.S. Pat. No. 6,122,417 is provided with a linear array of Fabry-Perot resonators, each of the resonators transmits a wavelength, and includes an improved mirror surface and optical fibers.

When the optical fibers are arranged to a structure formed on a wafer, since the optical fibers are perpendicular to the structure, packaging between the optical fibers and the structure cannot be achieved by using a batch process, thereby requiring additional equipments for arranging the optical fibers and hence making the manufacturing process thereof be complex.

Furthermore, the structure includes multiple layers deposited on the wafer, wherein the number of layers should be increased so as to obtain higher reflective mirror, resulting in increasing the manufacturing cost thereof.

SUMMARY OF THE INVENTION

It is, therefore, an object of the present invention to provide an optical tunable filter capable for use in an optical communication device.

It is another object of the present invention to provide an optical communication device for demultiplexing various wavelengths by using an array of optical tunable filters.

It is still another object of the present invention to provide an optical communication device for multiplexing various wavelengths by using an array of optical tunable filters.

In accordance with one aspect of the present invention, there is provided an optical tunable filters comprising: a fixed mirror including a number of first erecting plates; a movable mirror including a number of second erecting plates; an air gap disposed between the fixed mirror and the movable mirror; and an actuator reciprocating the movable mirror for changing the width of the air gap.

In accordance with another aspect of the present invention, there is provided an optical communication device for demultiplexing various wavelengths, comprising: an input optical fiber; a number of output optical fibers; and an array of optical tunable filters, wherein each of the optical tunable filters is regularly arranged to correspond to one output optical fiber, each of the optical tunable filters including: a fixed mirror including a number of first erecting plates; a movable mirror including a number of second erecting plates; an air gap disposed between the fixed mirror and the movable mirror; and an actuator reciprocating the movable mirror for changing the width of the air gap.

In accordance with still another aspect of the present invention, there is provided an optical communication device for multiplexing various wavelengths, comprising: a number of input optical fibers; an output optical fiber; and an array of optical tunable filters, wherein each of the optical tunable filters is regularly arranged to correspond to one input optical fiber, each of the optical tunable filters including: a fixed mirror including a number of first erecting plates; a movable mirror including a number of second erecting plates; an air gap disposed between the fixed mirror and the movable mirror; and an actuator reciprocating the movable mirror for changing the width of the air gap.

BRIEF DESCRIPTION OF THE DRAWINGS

The above and other objects and features of the present invention will become apparent from the following description of preferred embodiments given with reference to the accompanying drawings in which:

FIG. 3B represents a schematic view describing an electrostatic actuator utilizing parallel plate type moving electrodes in an optical tunable filter in accordance with the present invention;

FIG. 3C offers a schematic view portraying an electrostatic actuator utilizing teeth type moving electrodes in an optical tunable filter in accordance with the present invention;

DETAILED DESCRIPTION OF THE PREFERRED EMBODIMENT

An optical tunable filter in accordance with the present invention includes a fixed mirror having an array of first erecting plates, a movable mirror having an array of second erecting plates, an air gap disposed between the fixed mirror and the movable mirror, and an actuator reciprocating the movable mirror for changing the width of the air gap.

In the fixed and the movable mirror, each of the erecting plates is made of silicon (Si) and has a thickness determined by an equation of $(2m+1)\lambda/4n$, wherein "n" is a refraction index of silicon (Si) and "m" is 0 or a positive integer. The movable mirror further includes an oxide layer formed below the second erecting plates and functioning as a sacrificial layer.

The air gap has a width determined by an equation of $(2m+1)\lambda/4$, wherein "m" is 0 or a positive integer.

The actuator includes a fixed electrode and a movable electrode. The fixed electrode is mechanically connected to the movable electrode with an elastic member, e.g., a leaf spring, made of silicon and intervening therebetween. The movable electrode is mechanically coupled with the movable mirror. A link lever intervenes between the leaf spring and the movable electrode for reducing displacement of the movable mirror.

The followings are detailed descriptions of a preferred embodiment of the present invention with conjunction to the accompanying drawings.

Figure 1:
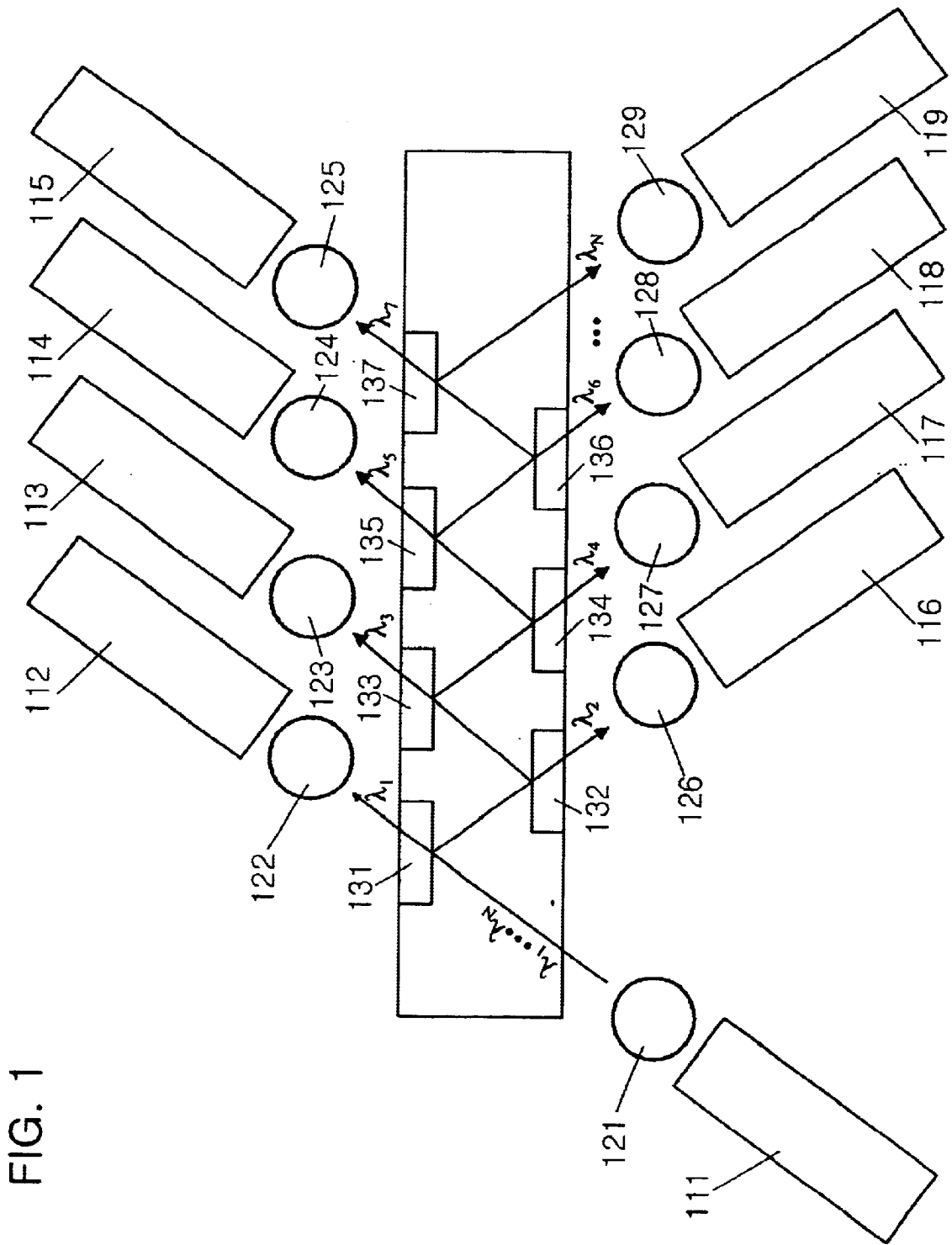
FIG. 1 is a schematic view setting forth an optical communication device such as a demultiplexer employing an array of optical tunable filters in accordance with the present invention.

FIG. 1 is represents a demultiplexer 100 employing an array of optical tunable filters in accordance with the present invention. The demultiplexer 100 includes an array of optical tunable filters 131, 132, 133, 134, 135, 136 and 137 formed on a SOI (Silicon On Insulator) substrate, an input optical fiber 111, a number of output optical fibers 112, 113, 114, 115, 116, 117, 118 and 119, and a number of collimating lenses 121, 122, 123, 124, 125, 126, 127, 128 and 129.

The input optical fiber 111 and the output optical fibers 112, 113, 114, 115, 116, 117, 118 and 119 are installed to the SOI substrate by utilizing a plurality of supporters such as trenches, waveguides or V-shaped grooves. Each of the collimating lenses 121, 122, 123, 124, 125, 126, 127, 128 and 129 is placed between a corresponding optical fiber and a corresponding filter with a supporting member, e.g., a V-shaped groove. The collimate lens 121 collimates optical signals (wavelengths) from the input optical fiber 111 onto the optical tunable filter 131. Other collimate lenses collimates optical signals (wavelengths) from a corresponding optical tunable filter onto a corresponding output optical fiber.

The optical tunable filters 131, 132, 133, 134, 135, 136 and 137 are formed with the silicon substrate micromachined by using a DRIE (Deep Reaction Ion-beam Etching) process. Each of the optical tunable filters 131, 132, 133, 134, 135, 136 and 137 includes a fixed mirror having an array of first erecting plates, a movable mirror having an array of first erecting plates, an air gap disposed between the fixed mirror and the movable mirror, and an actuator reciprocating the movable mirror for changing the width of the air gap. In the fixed mirror and the movable mirror, each of erecting plates is disposed in perpendicular to the SOI substrate with a gap interposed between neighboring erecting plates. Each of the optical tunable filters 131, 132, 133, 134, 135, 136 and 137 further includes a link lever disposed between the actuator and the movable mirror so as to transmit a reduced displacement from the actuator to the movable mirror.

Each of the optical tunable filters 131, 132, 133, 134, 135, 136 and 137 transmits one wavelength to a corresponding output optical fiber and reflects other wavelengths to an adjacent optical tunable filter, wherein the transmitted wavelength is determined by the width of the air gap modulated by the actuator. An Example is described in detail hereinafter. Various wavelengths ($\lambda 1, \ldots \lambda n$) is first incident upon the optical tunable filter 131 via the collimating lens 121. The optical tunable filter 131 transmits a wavelength ($\lambda 1$) and reflects other wavelengths ($\lambda 2, \ldots \lambda n$) to the adjacent optical tunable filter 132. The transmitted wavelength ($\lambda 1$) is transmitted to the output optical fiber 112 via the collimating lens 122. Repetition of the procedure leads each of the reflected wavelengths ($\lambda 2, \ldots \lambda n$) to be transmitted to a corresponding output optical fiber by using the remaining optical tunable filters 132, 133, 134, 135, 136 and 137.

Figure 2:
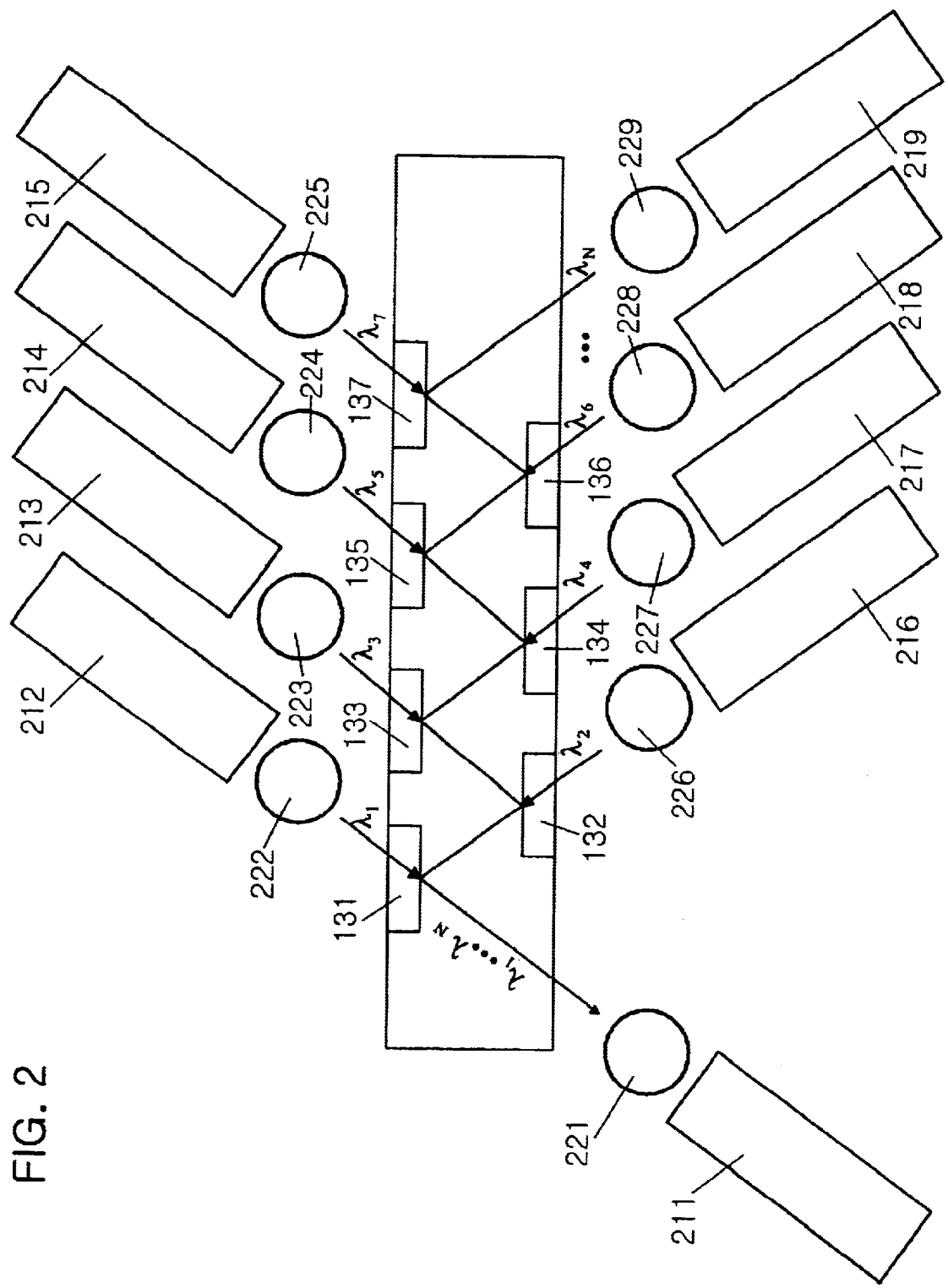
FIG. 2 shows a schematic view illustrating an optical communication device such as a multiplexer employing an array of optical tunable filters in accordance with the present invention.

FIG. 2 is represents a multiplexer 200 employing an array of optical tunable filters in accordance with the present invention. The multiplexer 200 is similar to the demultiplexer 100 except that an input optical fiber 111 and a number of output optical fibers 112, 113, 114, 115, 116, 117, 118 and 119 of the demultiplexer 110 are replaced with an output optical fiber 211 and a number of input optical fibers 212, 213, 124, 215, 216, 217, 218 and 219, respectively. Each of the optical tunable filters 131, 132, 133, 134, 135, 136 and 137 transmits a wavelength from a corresponding input optical fiber and reflects other wavelengths to an adjacent optical tunable filter, in such a way that all of wavelengths ($\lambda 1 \ldots \lambda n$) are transmitted from the input optical fibers 212, 213, 214, 215, 216, 217, 218 and 219 to the output optical fiber 211.

Figure 3A:
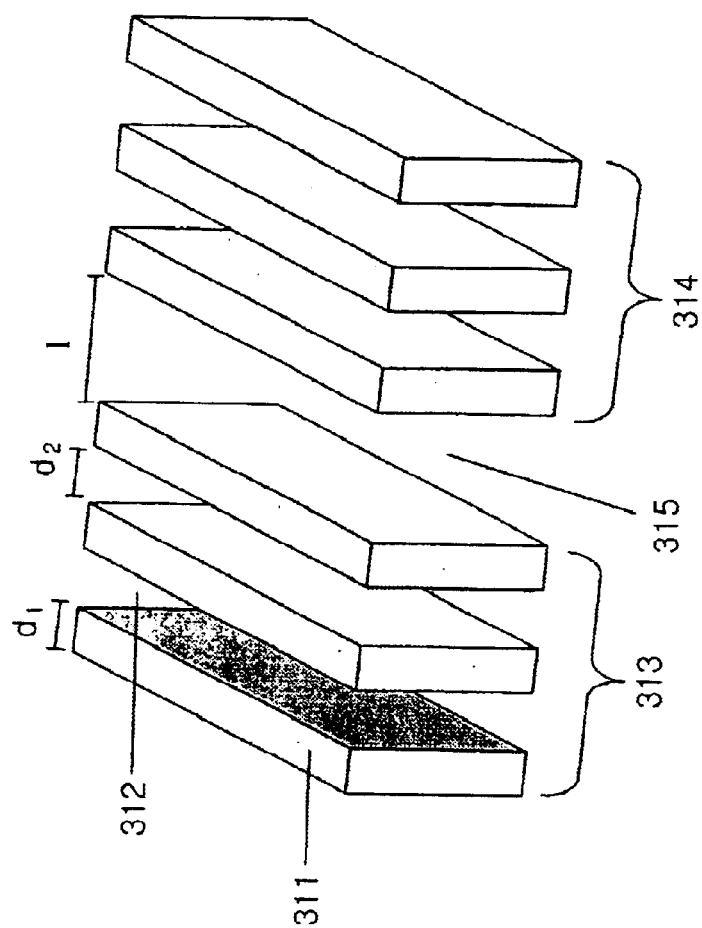
FIG. 3A provides a perspective view depicting a Distributed Bragg Reflector (DBR) incorporating therein silicon plates and air gaps in an optical tunable filter in accordance with the present invention.

FIG. 3A is a perspective view setting forth a Distributed Bragg Reflector (DBR) 320 in an optical tunable filter in accordance with the present invention. The DBR 320 includes a fixed mirror 313, a movable mirror 314 and an air gap 315 disposed between the fixed mirror 313 and the movable mirror 314, each of the mirrors 313, 314 having three silicon plates 311 and two intervals 312 disposed the silicon plates 311. Each of the silicon plate 311 has an optical thickness ("nd") determined by an equation of $(2m+1)l/4$, wherein "n" is a refraction index of silicon (Si), "1" is a width of the air gap, and "m" is 0 or a positive integer. Each of the intervals 312 has a thickness ("d") determined by an equation of $(2m+1)l/4$ since the refraction index of air is 1.

Thus, the DBR 320 including two mirrors 313, 314 obtains more than 99% of reflectance.

FIGS. 3B and 3C are a schematic view illustrating an electrostatic actuator 321 utilizing parallel plate typed moving electrode 317 and a schematic view portraying an electrostatic actuator 321 utilizing teeth typed moving electrode 319, respectively, in an optical tunable filter in accordance with the present invention. In FIGS. 3B and 3C, the actuator 321 utilizes an electrostatic force between a fixed electrode 316 and an moving electrode 317 or 319 as a driving force and an restoring force generated by an elastic member 318 such as silicon plate spring.

Figure 4:
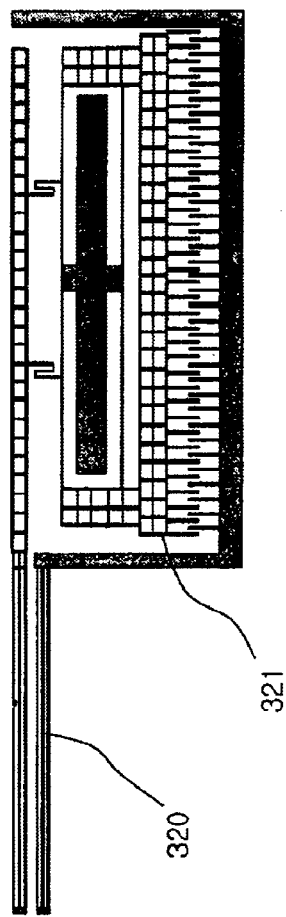
FIG. 4 presents a schematic view picturing an optical tunable filter employing therein an electrostatic actuator and a Distributed Bragg Reflector (DBR) in accordance with the present invention.

FIG. 4 presents a schematic view picturing an optical tunable filter 300 employing therein the electrostatic actuator 321 and the DBR 320 described above. The DBR 320 is fabricated on the SOI substrate by the DRIE (Deep Reactive Ion-beam Etching) process and the electrostatic actuator 321 is formed on the same SOI substrate to connect the DBR 320 and the electrostatic actuator 321, thereby forming the optical tunable filter 300.

Figure 5:
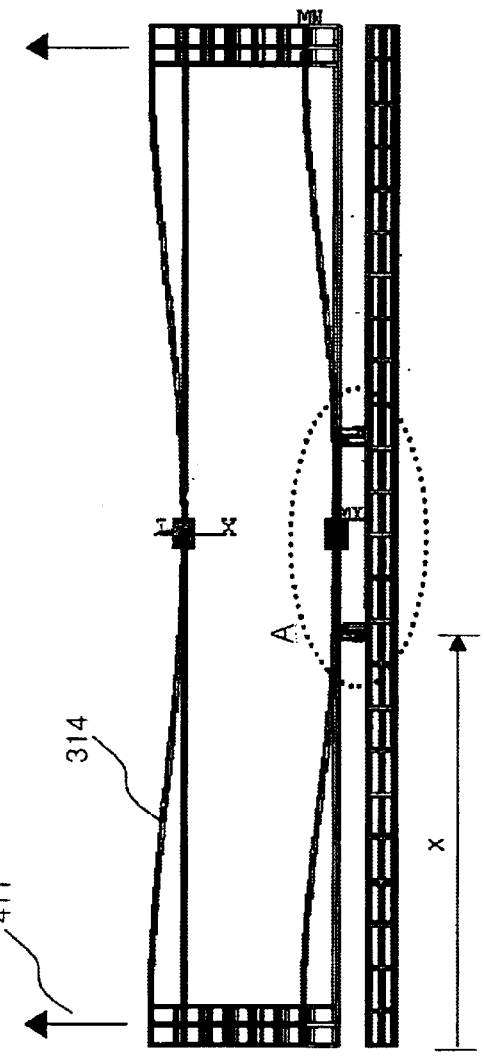
FIG. 5 shows a schematic view delineating an actuation of the electrostatic actuator incorporated in the optical tunable filter shown in FIG. 4.
Figure 6:
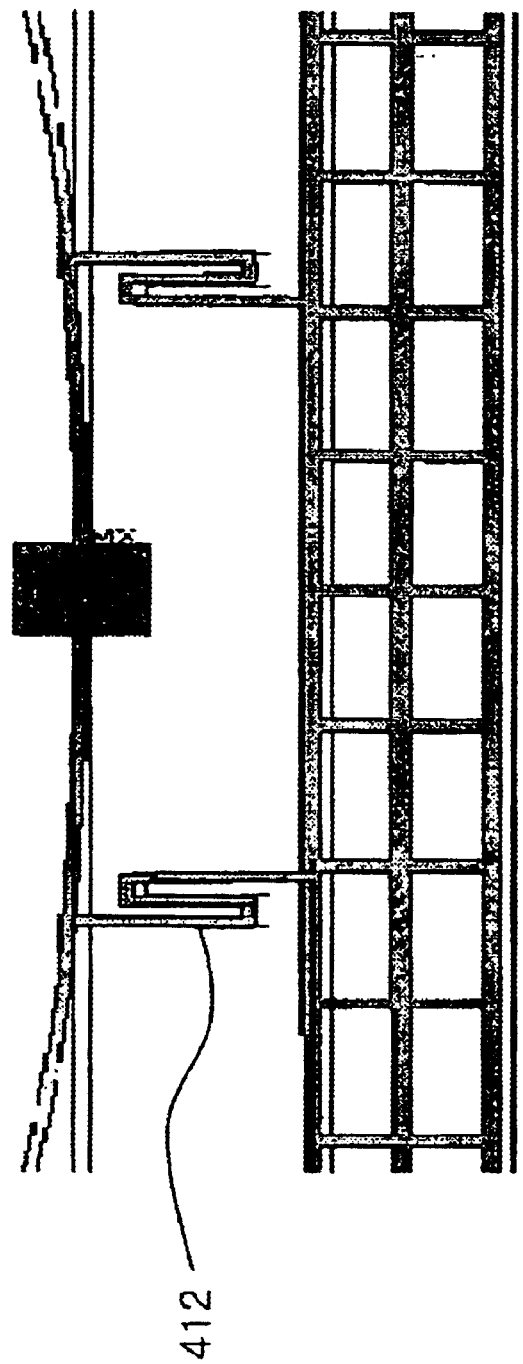
FIG. 6 provides an enlarged view picturing a portion "A" of FIG. 5.

FIGS. 5 and 6 shows a schematic view delineating an actuation of the electrostatic actuator 321 in the optical tunable filter 300 shown in FIG. 4 and an enlarged view picturing a portion "A" of FIG. 5. In order to obtain more accurate displacement and to increase tolerance error range, a link lever 412 can be incorporated in the optical tunable filter 300. The position (x) of the link lever 412 can be changed with respective to a required displacement. In other words, the link lever 412 allows the electrostatic actuator 321 to more accurately change the width of the air gap 315 between the fixed mirror 313 and the movable mirror 314.

Figure 7:
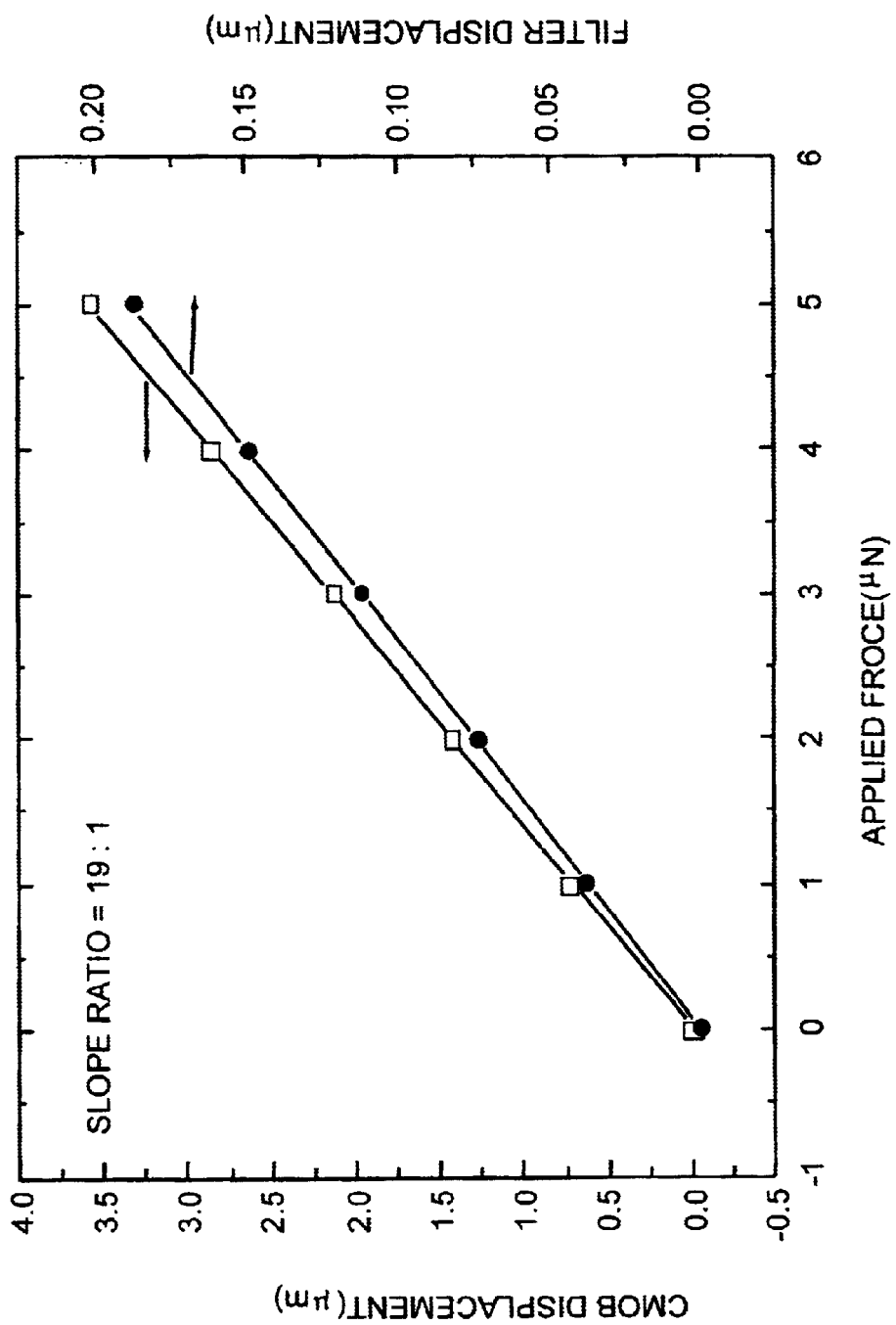
FIG. 7 represents a graph setting forth displacements of an movable mirror and an electrostatic actuator with respect to applied forces in accordance with the present invention.

FIG. 7 represents a graph setting forth displacements of a movable mirror and an electrostatic actuator with respect to applied forces in accordance with the present invention. It is noted that a ratio of the displacements of the movable mirror and the electrostatic actuator is represented as about 1:19.

Figure 8:
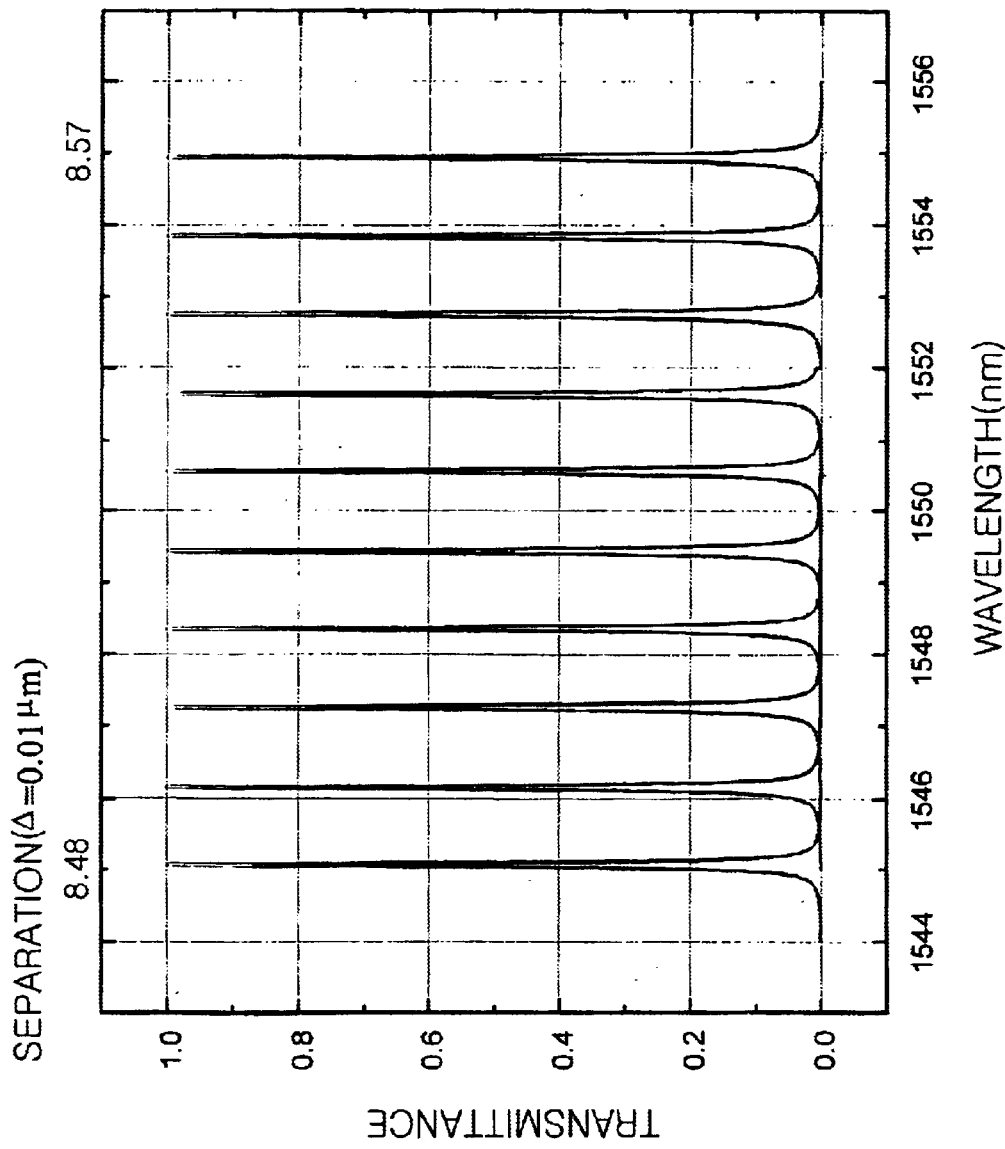
FIG. 8 offers a graph illustrating a relation between transmittance and wavelength in an optical tunable filter in accordance with the present invention.

FIG. 8 offers a graph illustrating a relation between transmittance and wavelength in an optical tunable filter, wherein the width of the air gap between the fixed mirror and the movable mirror is changed. FWHM (Full Width at Half Maximum) is below 0.8 nm and wavelength tunable range is about 80 nm. Accordingly, while optical communication requires 64 of wavelength in a terra-bit degree, the optical tunable filter 300 in accordance with the present invention can selectively transmit more 100 of wavelengths.

While the optical tunable filter is employed in the optical communication device such as demultiplexer or multiplexer, the present invention is not limited thereto. The optical tunable filter can be employed in other optical communication device such as Optical Cross Connection (OXC) since the optical tunable filter can selectively transmit a wavelength to a required port.

The inventive optical filter is fabricated by a way of the DBR is formed on the silicon substrate by using the DRIE method and the input and output optical fibers are also installed on the silicon substrate, thereby reducing the manufacturing cost thereof and making the mass production thereof be possible.

Additionally, the inventive optical filter includes an electrostatic actuator mechanically connected to the DBR, which will, in turns, can be tunable (wavelength-selective) in the optical filtering function.

Furthermore, the inventive optical filter can not only achieve high reflectance by using silicon and air which have high difference of the refractive index therebetween and are employed as materials for forming the fixed and the movable mirror incorporated in the DBR, but also can filter more various wavelengths in a range by utilizing the electrostatic actuator having an accurate modulation.

While the invention has been shown and described with respect to the preferred embodiments, it will be understood by those skilled in the art that various changes and modifications may be made without departing from the spirit and scope of the invention as defined in the following claims.

What is claimed is:

1. An optical tunable filters comprising:
   a fixed mirror including a number of first erecting plates;
   a movable mirror including a number of second erecting plates;
   an air gap disposed between the fixed mirror and the movable mirror; and
   an actuator reciprocating the movable mirror for changing the width of the air gap, wherein the actuator includes:
   a moving unit, which is coupled to the moving mirror, having a first electrode;
   a fixed unit, which is coupled to the fixed mirror, having a second electrode for generating an electrostatic force to pull the moving unit by reacting to the first electrode in order to control a gap between the moving unit and the fixed unit; and
   an elastic member disposed between the fixed mirror and the movable mirror connecting the moving mirror and the moving unit for delivering kinetic force of the moving unit in an adjustable manner with a predetermined ratio in order to finely control the air gap between the fixed mirror and the moving mirror.

2. The optical tunable filter as recited in claim 1, wherein each of the erecting plates made of silicon (Si) has a thickness determined by an equation of $(2m+1)\lambda/4n$, and the air gap has a width determined by an equation of $(2m+1)\lambda/4$, n being a refraction index of silicon (Si) and m being 0 or a positive integer.

3. The optical tunable filter as recited in claim 1, wherein the movable mirror further includes an oxide layer formed below the second erecting plates and functioning as a sacrificial layer.

4. The optical tunable filter as recited in claim 1, wherein the actuator includes a fixed electrode and a movable electrode, the fixed electrode being mechanically connected to the movable electrode with an elastic member intervening therebetween and the movable electrode being is mechanically coupled with the movable mirror.

5. The optical tunable filter as recited in claim 4, wherein the elastic member is a leaf spring made of silicon and a link lever intervenes between the leaf spring and the movable electrode for reducing displacement of the movable mirror.

6. An optical communication device for demultiplexing various wavelengths, comprising:
   an input optical fiber;
   a number of output optical fibers; and
   an array of optical tunable filters, wherein each of the optical tunable filters is regularly arranged to correspond to one output optical fiber, each of the optical tunable filters including:
   a fixed mirror including a number of first erecting plates;
   a movable mirror including a number of second erecting plates;
   an air gap disposed between the fixed mirror and the movable mirror; and
   an actuator reciprocating the movable mirror for changing the width of the air gap, wherein the actuator has:

a moving unit, which is coupled to the moving mirror, having a first electrode;

a fixed unit, which is coupled to the fixed mirror, having a second electrode for generating an electrostatic force to pull the moving unit by reacting to the first electrode in order to control a gap between the moving unit and the fixed unit; and an elastic member disposed between the fixed mirror and the moveable mirror connecting the moving mirror and the moving unit for delivering kinetic force of the moving unit in an adjustable manner with a predetermined ratio in order to finely control the air gap between the fixed mirror and the moving mirror.

7. An optical communication device for multiplexing various wavelengths, comprising:

a number of input optical fibers;

an output optical fiber; and an array of optical tunable filters, wherein each of the optical tunable filters is regularly arranged to correspond to one input optical fiber, each of the optical tunable filters including:

a fixed mirror including a number of first erecting plates;

a movable mirror including a number of second erecting plates;

an air gap disposed between the fixed mirror and the movable mirror; and an actuator reciprocating the movable mirror for changing the width of the air gap, wherein the actuator has:

a moving unit, which is coupled to the moving mirror, having a first electrode;

a fixed unit, which is coupled to the fixed mirror, having a second electrode for generating an electrostatic force to pull the moving unit by reacting to the first electrode in order to control a gap between the moving unit and the fixed unit; and an elastic member disposed between the fixed mirror and the movable mirror connecting the moving mirror and the moving unit for delivering kinetic force of the moving unit in an adjustable manner with a predetermined ratio in order to finely control the air gap between the fixed mirror and the moving mirror.

\* \* \* \* \*